July 3, 1928. 1,675,866
P. H. PIERCE
SELECTIVE SIGNALING CIRCUITS
Filed July 13, 1921
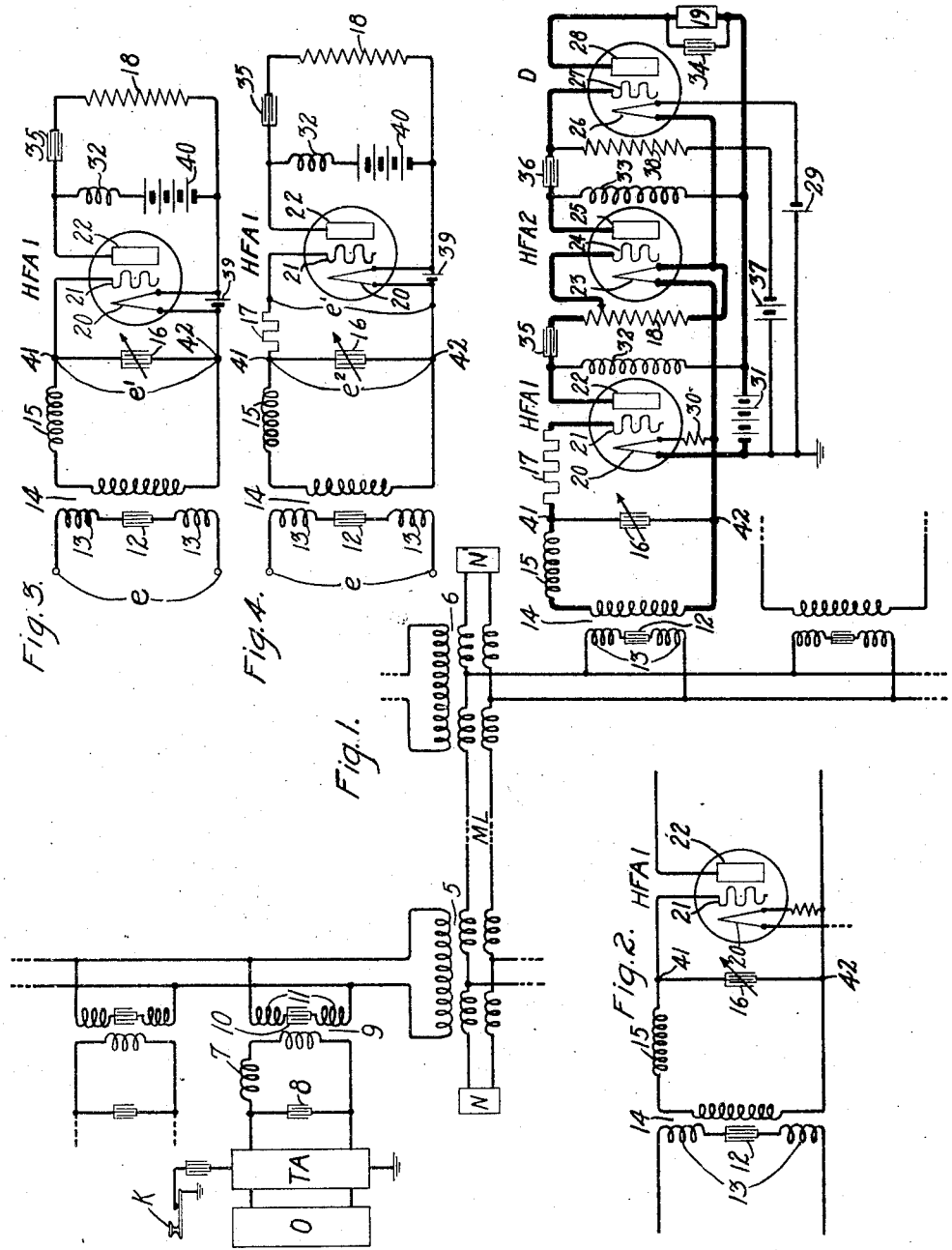
Inventor:
Paul H. Pierce.
by C. A. Sprague
Att'y:

Patented July 3, 1928.

1,675,866

UNITED STATES PATENT OFFICE.

PAUL H. PIERCE, OF WESTFIELD, NEW JERSEY, ASSIGNOR TO WESTERN ELECTRIC COMPANY, INCORPORATED, OF NEW YORK, N. Y., A CORPORATION OF NEW YORK.

SELECTIVE SIGNALING CIRCUITS.

Application filed July 13, 1921. Serial No. 484,342.

This invention relates to method of and means for selectively receiving alternating currents.

In radio signaling, highly selective receiving circuits are desirable in order to reduce interference which may be due either to static disturbances or to waves of slightly different frequency transmitted by other stations. Again, in multiplex carrier wave signaling systems over wires, wherein a plurality of waves of different frequencies are employed, it is desirable to use highly selective receiving sircuits, in order that as many signaling channels as possible within an available frequency range may be provided for communication over a single conductor or a pair of conductors.

The desirability of such a highly selective receiving circuit has long been realized and various attempts have been made to provide such an arrangement. For example, in Patent No. 1,297,188, March 11, 1919, I. Langmuir disclosed an arrangement for this purpose. High selectivity was therein obtained by connecting in cascade a plurality of tuned circuits and high frequency amplifiers feeding into a thermionic vacuum tube detector. The degree of selectivity was determined by the number of tuned circuits and amplifiers so connected.

An object of the present invention is to provide a highly selective circuit. Another object of the invention is to provide an arrangement for associating an amplifier with a tuned circuit without impairing the selectivity of the tuned circuit. A further object of the invention is to prevent a variable impedance element from reacting upon a tuned circuit with which it is electrically associated.

The selectivity of a loop tuned circuit comprising lumped inductance and lumped capacity depends upon the value of the effective series resistance of the loop at the receiving frequency. This resistance may be due to an actual ohmic resistance connected in series in the loop, such as the resistance of the conductor comprising the lumped inductance, or it may be an apparent resistance, called "effective resistance", which may be due to several causes such as hysteresis loss in the iron core of the lumped inductance, or eddy current loss in the core and windings, or to an actual resistance of finite value connected between two electrically separated points of the loop. In any actual physical circuit, it is a summation of these several components.

It has been common practice to keep the ohmic resistance and the effective resistance of the lumped inductance and lumped capacity as low as is economically possible. According to this invention a means is provided which practically eliminates the effective resistance due to a finite value of resistance connected between two electrically separated points of the loop. By practically eliminating this last mentioned component of effective resistance, a highly selective receiving circuit has been obtained.

The invention will be more clearly understood by reference to the accompanying drawing wherein Fig. 1 shows schematically a carrier wave telegraph system embodying one form of this invention; Fig. 2, a portion of the circuit of Fig. 1 arranged in accordance with the prior art and Figs. 3 and 4 are schematic drawings of circuits actually tested to obtain data which will be given hereinafter.

Referring now to Fig. 1, the carrier wave telegraph system therein shown comprises a common transmission line ML to which a plurality of transmitting stations are connected through the balanced transformer 5 with its associated balancing network N and to which a plurality of cooperating receiving stations are connected through the balanced transformer 6 with its associated network $N^1$. Each transmitting station comprises an oscillator O, an amplifier TA and a loop tuned circuit comprising a lumped inductance 7, the primary of transformer 9 and a condenser 8. This loop tuned circuit is loosely coupled through transformer 9 to a series tuned circuit comprising a capacity element 10 and the inductive coils 11 constituting the secondary winding of the transformer 9. This series tuned circuit in turn is connected to the balanced transformer 5. The oscillator O is normally active, but oscillations are prevented from being transmitted to the common line ML by a short circuit at the amplifier TA. This short circuit is controlled by the key K.

Each of the plurality of transmitting channels is similarly arranged and connected with the common line ML through the transformer 5.

Each receiving circuit comprises a series tuned circuit having a capacity element 12 and inductive elements 13 which are connected to the common line ML through the balanced transformer 6. Loosely coupled to this series circuit through the transformer 14 is a loop tuned circuit comprising the secondary winding of transformer 14, an inductive element 15 and a capacity element 16. Connected to this loop tuned circuit through a resistance 17 is a high frequency amplifier HFA1 connected through a potentiometer 18 to a second high frequency amplifier HFA2, which in turn is directly connected to a detector D. A receiving device 19, responsive to unidirectional current from the detector D, is connected thereto.

The high frequency amplifiers HFA1 and HFA2 and the detector D may comprise well known thermionic three-electrode discharge devices. The amplifier HFA1 has a filament 20, a grid 21 and a plate 22. The amplifier HFA2 has a filament 23, a grid 24 and a plate 25. The detector D has a filament 26, a grid 27 and a plate 28. As shown, the three filaments 20, 23 and 26 are connected serially with a battery 29 and a resistance 30. The function of this resistance is to normally maintain the grid 21 at a small negative potential with respect to the filament 20. Between the filament and the plate of each device is a battery 31. Between the battery 31 and the plate 22 of high frequency amplifier HFA1 and the plate 25 of the high frequency amplifier HFA2 are connected respectively choke coils 32 and 33. The function of these coils is to permit the flow of direct current while substantially preventing the flow of any alternating current. Receiving device 19 is connected in series with the battery 31 between the plate 28 of the detector D and the series filament circuit. A condenser 34 is connected in shunt of the receiver 19 to improve the operation of the detector D in a manner which is well known. The stopping condensers 35 and 36 are provided to prevent the flow of direct current from the battery 31 in the potentiometer 18 and the resistance 38 associated with the high frequency amplifier HFA2 and the detector D respectively. Between the series filament circuit and the grid 27 of detector D is connected a battery 37 and a high resistance 38. The battery 37 has its negative terminal connected to the grid 27 and the high resistance 38 provides a grid leak, the operation of which in connection with a detector is well known and therefore does not require further description.

Each of the plurality of receiving channels is similarly arranged and connected to the common line ML through the transformer 6.

It is understood, of course, that a distinctive carrier frequency is employed for each transmitting channel and its cooperating receiving channel and that the constants of the tuned circuits of the several channels will necessarily be different in order that each of the different carrier frequencies may be confined to its proper channel. It is also to be understood that a plurality of receiving channels may be connected to the balanced transformer 5 and also that a plurality of transmitting channels may be connected to the balanced transformer 6. For simplicity such channels are not shown in the arrangement of Fig. 1 although their connection is indicated therein.

In the arrangement of Fig. 1, the resistance 17 is connected between the point 41 in the loop tuned circuit and the grid 21 of the high frequency amplifier HFA1; while the filament is connected at 42. Thus the input circuit of the amplifier, including the resistance 17, is connected in parallel with the condenser 16 of the loop tuned circuit. This resistance is provided in accordance with one embodiment of this invention. In Fig. 2 wherein similar reference characters are used to indicate similar elements, the input terminals of an amplifier are connected directly to opposite terminals respectively of the condenser of a loop tuned selective circuit, no resistance such as 17 being used. This arrangement is in accordance with the disclosures of the prior art, such for instance as that of the Langmuir patent hereinbefore mentioned. Its operation will be referred to hereinafter.

In order to transmit signals over the channel illustrated in Fig. 1, the key K is depressed in accordance with the signals to be transmitted, for example, in accordance with the characters of the Morse code. Each time that the key is depressed, thereby removing the short circuit from the amplifier TA, trains of carrier waves are transmitted through the loop tuned circuit and series tuned circuit of the transmitting channel, through the balanced transformer 5 over the common line ML, through the balanced transformer 6 to the series and loop tuned circuits of the receiving channel, through the high frequency amplifiers HFA1 and HFA2 and then to the detector D where they are detected to actuate the receiving device 19.

Due to the physical construction of the thermionic discharge devices, which would be used in such a system there are of necessity leakage paths between the sealing-in terminals of the several electrodes. These paths have a finite resistance value which, as will appear from the arrangement of Fig. 1, are connected in shunt to the grid 21 and the filament 20 and through the resistance 17 across the condenser 16. In the arrangement of Fig. 2, these paths are connected directly in shunt to the condenser 16 and energy dissipated therein tends to reduce the selectivity of the loop tuned circuit; whereas Fig. 1 shows the resistance 17 connected in series with these leakage paths, whereby the resistance in shunt with the condenser 16 is increased and the energy dissipated therein is reduced.

The purpose of the resistance 17 is to fix a definite minimum finite value of resistance for the input circuit of the amplifier HFA1, which is connected between the points 41, 42 of the tuned loop. With such a minimum fixed the amount of energy which will be dissipated therein under given conditions will be fixed and the minimum degree of selectivty of the tuned loop will be determined.

Another important source of energy loss, which appears as "effective resistance", is in the grid-filament circuit within the tube itself. As long as the potential of the grid is negative with respect to the filament this resistance is exceedingly high and there is no actual flow of current from grid to filament, but such is not the case where the grid becomes positive as it may in actual service. When this condition exists energy will be dissipated within the tube and the selectivity of the loop tuned circuit will be further reduced thereby. The resistance 17, being connected in series with the grid-filament circuit minimizes this loss and so improves the selectivity.

Measurements have been made using the circuits schematically shown in Figs. 3 and 4, which prove that the selectivity of the loop tuned circuit is actually improved by the use of the resistance 17. It will be noted that the circuits of Figs. 3 and 4 correspond closely to certain portions of the circuits of Figs. 2 and 1 respectively and their relation is clearly shown, since similar reference characters are used for similar parts in all of the figures. For heating the filaments, however, battery 29 of Figs. 1 and 2 has been replaced by battery 39 in Figs. 3 and 4 and plate battery 31 of Figs. 1 and 2 has been replaced by plate battery 40 in Figs. 3 and 4. In the actual circuits tested, the value of the inductance 15 was approximately 150 millihenries; the value of capacity 16 was approximately .0065 microfarads; the value of capacity 35 was one-half microfarad; the series resistance of the potentiometer 18 was one-half megohm and the valve of the resistance 17 was 96000 ohms. The voltage $e$ across the input series tuned circuit was measured as was also the voltage $e^1$ between the grid and filament in both circuit arrangements. This is the effective voltage impressed upon the grid of the amplifier. In the case of Fig. 4, the voltage $e^2$ across the condenser 16 was also measured.

The following table gives the ratios of these voltages at various frequencies both above and below the resonant frequency of 4750 cycles:

| Frequency | 1 $\frac{e'}{e}$ of Fig. 3 | 2 $\frac{e'}{e}$ of Fig. 4 | 3 $\frac{e^2}{e}$ of Fig. 4 |
|---|---|---|---|
| 4550 | 1.6 | .9 | 1.9 |
| 4600 | 2.4 | 1.5 | 3.4 |
| 4650 | 3.4 | 2.5 | 5.5 |
| 4700 | 5.0 | 4.5 | 8.8 |
| 4750 (resonant) | 6.3 | 8.0 | 11.8 |
| 4800 | 5.7 | 6.0 | 10.5 |
| 4850 | 3.5 | 2.8 | 4.7 |
| 4900 | 2.3 | 1.7 | 2.7 |
| 4950 | 1.6 | 1.1 | 1.7 |

From these data it will be seen that the sharpness of tuning is much greater in the circuit of Fig. 4 with the resistance 17 connected between the grid 21 of amplifier HFA1 and the point 41 of the loop tuned circuit, than in the circuit of Fig. 3 without such resistance. This is apparent from the rapidly decreasing ratio of output to input voltages shown in columns 2 and 3 of the above table as the frequency departs from the resonant value. From the same data it will also be seen that the effective voltage impressed upon the grid of the amplifier HFA1 by the arrangement of Fig. 4 will be greater at the resonant frequency than that shown in Fig. 3 (see columns 1 and 2) and that the ratio of output to input voltage at his frequency for the tuned circuit is also greater (see columns 1 and 3). In fact, at the resonant frequency, the voltage available across the condenser 16 of Fig. 4 is almost double that across the condenser 16 of Fig. 3. In short, a tuned circuit arranged in accordance with this invention, i. e., having the resistance 17 or other means to give the same resistance effect associated with it, is much more sharply selective than those hitherto employed.

The condenser 35 is of small enough capacity to substantially prevent the flow of low frequency or signaling frequency currents in the output circuit of the high frequency amplifier HFA1. As mentioned hereinbefore in an actual test circuit its value was one-half microfarad. In another circuit giving equally good results its value was 0.1 microfarad.

Other arrangements than the resistance 17 may be used to increase the effective resistance in shunt with the condenser 16 or in shunt with any two points in the loop tuned circuit which are electrically separated. Such arrangements are to be understood as falling within the purview of this invention.

Although the invention has been disclosed as embodied in a specific carrier wave signaling system, it is obvious that it is applicable to selective circuits generally without regard to the purpose for which they are used. The invention is therefore to be limited only by the scope of the appended claims.

What is claimed is:

1. A selective receiving circuit comprising a loop tuned circuit, a thermionic amplifier having an input circuit including a heated filament and an impedance control element associated with said loop tuned circuit at two electrically separated points, and means to increase the selectivity of the loop tuned circuit comprising a high resistance to increase the apparent resistance of the input circuit viewed from said two points.

2. A selective receiving circuit comprising a loop tuned circuit having an inductive element and a capacity element connected in shunt therewith, a thermionic amplifier having an impedance control element and a heated filament, means to connect said filament to one terminal of said capacity element, and means to increase the selectivity of the loop tuned circuit comprising a high resistance means for connecting said control element to the other terminal of said capacity element.

3. In a selective receiving circuit for carrier oscillation, a thermionic amplifier having an impedance control element and a cathode in the form of a heated filament, a loop tuned circuit having a tuning condenser, means to increase the selectivity of the loop tuned circuit comprising a resistance means of the order of 100,000 ohms to connect said control element to one terminal of said condenser, and other means to connect the cathode to the other terminal, said resistance means maintaining the circuit including the control element and the cathode in shunt to said condenser at a definite high value.

4. A selective receiving circuit comprising a loop tuned circuit having a tuning condenser, an amplifier comprising a pure electron discharge device having an impedance control element and a cathode element, said impedance control element being normally maintained at a negative potential with respect to the cathode, and means to increase the selectivity of the loop tuned circuit comprising a high impedance for connecting the control element terminal and the cathode terminal of the amplifier in shunt to said condenser, said impedance maintaining the effective resistance of the circuit in shunt to the condenser above a fixed finite value.

In witness whereof, I hereunto subscribe my name this 9th day of July A. D., 1921.

PAUL H. PIERCE.